Patented Sept. 1, 1942

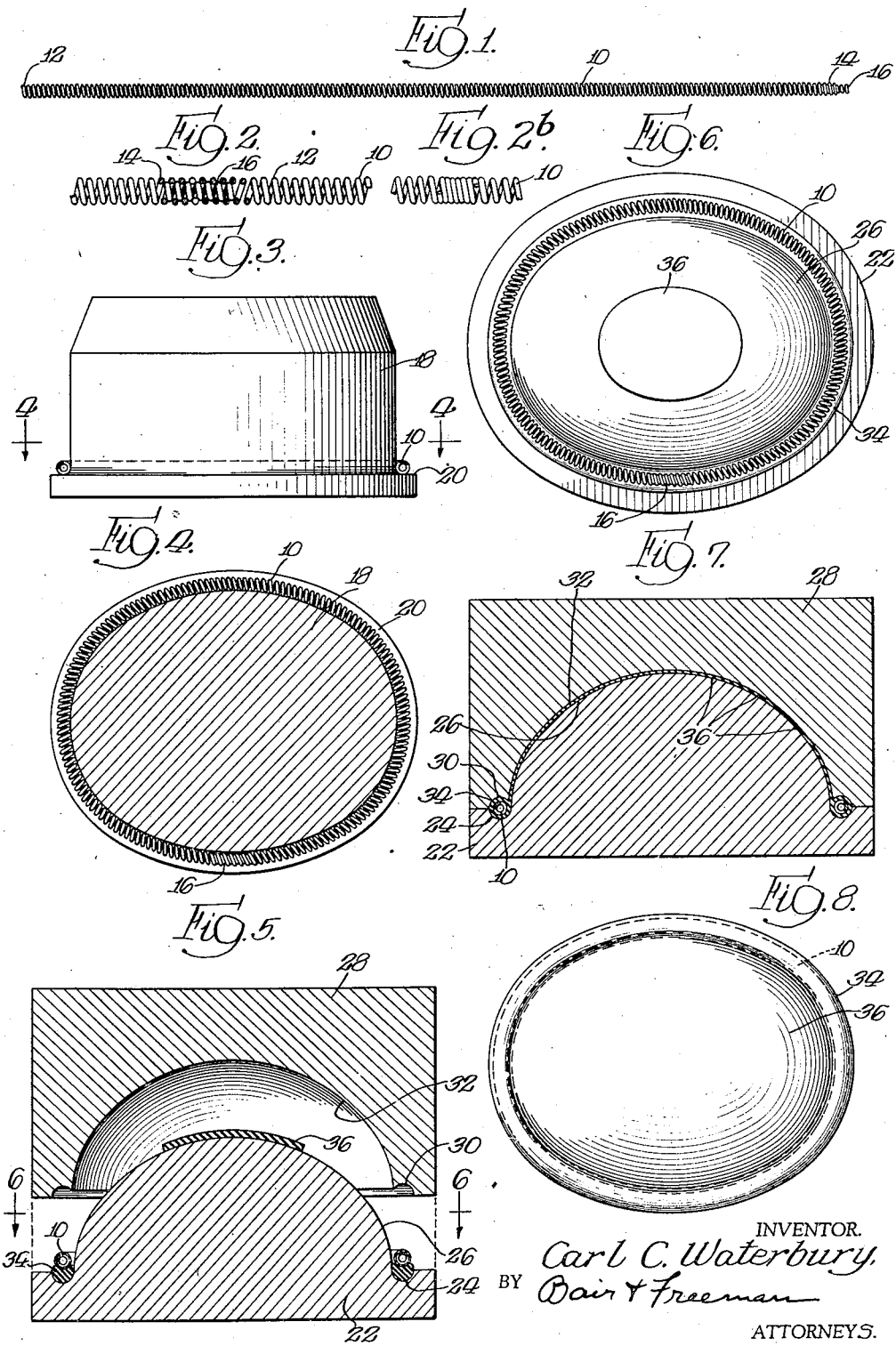

2,294,589

UNITED STATES PATENT OFFICE 2,294,589

METHOD FOR MAKING RUBBER ARTICLES

Carl C. Waterbury, Chicago, Ill.

Application February 13, 1939, Serial No. 256,151

4 Claims. (Cl. 18—59)

My invention relates to a method for making a rubber article and particularly the fabrication of an article having a sheetlike form with a metallic substance embedded therein.

Among the objects of my invention is the provision of a new and improved method for manufacturing a rubber article in which a metallic ring is incorporated into the rubber at the rim wherein the rubber is molded into shape in a single operation.

Another object is the provision of a new and improved method for making a molded rubber article having a domelike shape and a resilient metallic member embedded in the edge or rim thereof whereby the rim may be provided with a permanent set for preserving the rim in a substantially noncircular shape.

A further object is the provision of a new and improved method of making a dome-shaped rubber article which has embedded therein a resilient metallic member which contemplates first detempering and retempering the metallic portion so that it will have a fixed desired shape and then incorporating it into the rubber portion of the article so that it is completely embedded therein.

A further object still of my invention is specifically the formation of a rubber article that is known as a pessary including a resilient metallic rim forming the outside dimension of the article into a permanent elliptical or oval shape.

With these and other objects in view, my invention, as hereinafter more fully set forth, and pointed out in my claims may be illustrated in the accompanying drawing, in which Figure 1 is a view of the resilient metallic member which forms a portion of the edge or rim of the article;

Figure 2 shows the joint for connecting together the ends of the resilient member;

Figure 2b shows a modified form of joint for connecting the ends of the resilient member;

Figure 3 is a side elevation view of a portion of the apparatus used in forming the resilient member to a desired shape;

Figure 4 is a top sectional view taken on the line 4—4 of Figure 3;

Figure 5 is a cross sectional view of the mold prior to the formation of the article;

Figure 6 is a top plan view taken on the line 6—6 of Figure 5;

Figure 7 is a cross sectional view of the mold with the parts in closed position, and Figure 8 is a top plan view of the rubber article.

In the formation of rubber goods in which a metallic substance is incorporated and especially where such goods are to be used upon the human body where contact with the metallic material might be harmful, it is exceedingly necessary to completely and effectively cover the metallic materials with a rubberlike substance, which is frequently a pure rubber, in such a manner that there will be a sufficient thickness of the rubber over all portions of the metal so that there will be no danger of the metal being exposed.

Particularly in the formation of articles known as pessaries it is desired to have the general contour and shape of a substantially oval or elliptical configuration rather than having them circular. In order that such articles may retain such an elliptical shape the metallic portion must be given a permanent set so that it will permanently maintain the desired configuration.

The method comprising my invention is shown substantially by the series of steps illustrated by the figures of the drawing.

In practicing this method a strip of coiled and tempered spring wire indicated by the character 10 on Figure 1 is adapted to have the ends 12 and 14 joined together by means of a short coil of wire 16 of smaller diameter. The connection itself is shown on a larger scale in Figure 2 and is accomplished by first screwing the smaller diameter coil into one end 14 of the long coil 10 two or three threads and then bringing the other end 12 to it after twisting it slightly so that when the large coil untwists itself it will thread the end 12 onto the smaller coil 16 two or three threads. This because of the natural resilience of the spring wire will form a circular ring of coiled and tempered wire having a diameter corresponding to the length of wire used. As an alternative the ends of the coil may be spread slightly an amount equivalent to the thickness of the wire and threaded together without the short coil 16 as shown in Figure 2b.

In order to form the ring into an elliptical shape the ring may be placed upon an elliptically shaped block 18 shown in Figure 3 and pressed down against a shoulder 20 at the bottom of the block. The block with the ring is then subjected to mild heat in order to distemper the metal comprising the ring which then assumes a permanent set of an elliptical shape such as shown in Figure 4. After this has been accomplished the ring is removed and retempered so that it again becomes a resilient ring but having a permanent substantially elliptical configuration.

The next step in the process comprises forming the elliptically shaped ring and a mass of rubberlike material into the shape of a pessary. The mold used for this purpose comprises in general a lower block 22 which is provided with a recess 24 having an elliptical shape and a dome-shaped center 26. The upper portion of the mold comprises an upper block 28 which is provided with a recess 30 complementary to the recess 24 and a hollow dome-shaped portion 32 complementary to the dome-shaped center 26 of the lower block.

The molding blocks are utilized by first placing in the recess 24 a strip or mass of crude rubberlike material 34 which may be annular in shape. The ring 10 is frequently wrapped in very thin calendered raw rubber material to keep it from touching the mold and is placed upon the top of this mass of crude rubber material, the ring 10 now having an elliptical shape so as to exactly fit within the recess 24. Next a disc 36 of the same rubberlike substance is cut so as to have preferably an elliptical form in the same proportion as the form of the coiled metallic member comprising the rim or edge but made considerably smaller as shown in Figure 6. This sheet of elliptical material is placed upon the top of the dome 26 of the lower block in the manner shown in Figure 5 after which the upper block 28 is pressed into place by the exertion of considerable pressure and at the same time the mold is heated to a required temperature.

During subjection of the process to heat the blocks 22 and 28 are pressed together into the form shown in Figure 7. Meanwhile the material forming the rubberlike mass within the recess 24 melts and permits the ring 10 to be embedded therein and completely surrounded by the rubberlike material which at the same time fills the spaces between the coils of the spring.

During the same operation the small elliptical disc of rubberlike material 36 is compressed and melted and forced to run downwardly within the cavity formed between the dome shaped portions 26 and 32 of the mold blocks until it joins the molten rubberlike material in the recesses 24 and 30 thereby forming a complete domelike sheet of rubber joined at the edges by means of the elliptical spring impregnated with the rubberlike material.

The molding blocks are then removed and the completed article as shown in Figure 8 retains its domelike shape with its edge having a permanent configuration in the shape of an ellipse.

In practicing the method comprising my invention it is of course to be borne in mind that some shapes other than ellipses may be desired such as an oval shape where one curved end is smaller than the other or in fact any desirable shape and all of these possible variations can be secured by practicing the invention as described subject to modifications which are within the scope of the appended claims.

I claim as my invention:

1. A method of forming a dome-shaped rubber article having a spirally coiled metallic ring embedded therein, including the steps of placing a mass of rubber in the rim-forming cavity of a mold element having a lower rim-forming cavity and a dome-forming portion positioned centrally with respect to said cavity, placing the metallic ring upon the mass, separated from the bottom of the cavity thereby, placing another mass of rubber on the dome-forming portion of the mold element, and then pressing a complementary mold element against the first mentioned mold element and simultaneously heating the materials whereby the rubber is forced between the spiral elements of the ring and the ring is embedded in the first mass and surrounded by rubber, and the second mass of rubber is spread evenly over the dome portion and into contact with the first mass on all sides.

2. A method of forming a dome-shaped rubber article having a resilient metallic annulus embedded in the rim thereof, including the steps of placing a mass of rubber in the rim-forming cavity of a mold element having a lower rim-forming cavity and a dome-forming portion positioned centrally with respect to said cavity, placing the metallic annulus upon the mass, placing another mass of rubber on the dome-forming portion of the mold element, and then pressing a complementary mold element against the first mentioned mold element and simultaneously heating the materials, whereby the annulus is embedded in the first mass and surrounded by rubber, and the second mass of rubber is spread evenly over the dome portion and into contact with the first mass on all sides.

3. A method of forming a rubber article including the steps of placing an annulus of plastic rubber material in the rim-forming groove of a mold element having an elliptical rim-forming groove and a dome-forming portion positioned centrally with respect to said groove, placing a ring of coiled spring wire upon the annulus, separated thereby from the bottom of the groove, placing a sheet of rubber material on top of the dome-forming portion, and then pressing a complementary mold element against the first mold element and simultaneously heating the materials, whereby the individual coils of the spring are embedded in the annulus to form a resilient rim on the article, and the sheet of rubber material is spread evenly over the dome portion and into contact with the rim.

4. A method of utilizing upper and lower mold blocks having respectively complementary male and female dome-forming parts and elliptical rim-forming cavities to form a dome-shaped rubber article having a substantially elliptical rim including a coiled metal spring embedded therein, consisting of placing an annulus of rubber material upon the lower mold block within the rim-forming cavity and retaining the shape of the annulus in an elliptical form by the walls of said last cavity, placing a ring of coiled spring wire having a predetermined elliptical form upon the annulus with said ring held thereby out of contact with the bottom of said last cavity, placing a disc of elliptically formed rubber material upon the top of the dome-forming part, then applying the upper mold block to the lower mold block and subjecting both blocks simultaneously to heat and pressure, thereby forming the annulus of rubber material into a semi-fluid mass surrounding the individual coils of the spring, with the outside of the ring covered by said rubber material, and spreading the disc of material downwardly on all sides to join the rubber material of the annulus.

CARL C. WATERBURY.